US009242687B2

(12) United States Patent
Lee

(10) Patent No.: US 9,242,687 B2
(45) Date of Patent: Jan. 26, 2016

(54) SEAT ASSEMBLY

(71) Applicant: CIONLLI INDUSTRIAL CO., LTD., Nantou, Nantou Hsien (TW)

(72) Inventor: Daniel Lee, Nantou (TW)

(73) Assignee: CIONLLI INDUSTRIAL CO., LTD., Nantou Hsien (TW)

( * ) Notice: Subject to any disclaimer, the term of this patent is extended or adjusted under 35 U.S.C. 154(b) by 0 days.

(21) Appl. No.: 14/277,936

(22) Filed: May 15, 2014

(65) Prior Publication Data

US 2015/0151803 A1 Jun. 4, 2015

(30) Foreign Application Priority Data

Dec. 2, 2013 (TW) ............................. 102222590 U

(51) Int. Cl.
*B60N 2/40* (2006.01)
*B62J 1/00* (2006.01)
*B62J 1/08* (2006.01)

(52) U.S. Cl.
CPC ..... *B62J 1/08* (2013.01); *B62J 1/00* (2013.01)

(58) Field of Classification Search
CPC ...................................... B62J 1/00; B62J 1/08
USPC ................... 297/195.1, 215.16; 403/265, 269
See application file for complete search history.

(56) References Cited

U.S. PATENT DOCUMENTS

| 3,476,496 | A | * | 11/1969 | Golden | 297/215.16 |
| 6,213,488 | B1 | * | 4/2001 | Filice et al. | 297/215.16 X |
| 6,364,292 | B1 | * | 4/2002 | Chen et al. | 297/195.1 X |
| 8,668,262 | B2 | * | 3/2014 | Kim | 297/195.1 X |
| 2011/0241389 | A1 | * | 10/2011 | Tsai | 297/195.1 |

FOREIGN PATENT DOCUMENTS

TW M386218 U1 8/2010

* cited by examiner

*Primary Examiner* — Rodney B White
(74) *Attorney, Agent, or Firm* — Hamre, Schumann, Mueller & Larson, P.C.

(57) ABSTRACT

A seat assembly includes a seat tube, a plug member and a saddle. The seat tube extends along an axis, and has an end portion formed with an opening that has a center coinciding with the axis, and a plurality of angularly-spaced apart through holes that surround the axis. The plug member is plugged into the opening, and has a chamber in spatial communication with the through holes. The saddle includes a saddle body, and a connecting portion connected to the saddle body. The connecting portion has a covering segment covering the end portion, and an inner segment disposed in and connected to the covering segment and filled in the through holes and the chamber.

5 Claims, 6 Drawing Sheets

SEAT ASSEMBLY

CROSS-REFERENCE TO RELATED APPLICATION

This application claims priority of Taiwanese Patent Application No. 102222590, filed on Dec. 2, 2013.

BACKGROUND OF THE INVENTION

1. Field of the Invention

The invention relates to a seat assembly, more particularly to a bicycle seat assembly.

2. Description of the Related Art

Referring to FIGS. 1 and 2, a conventional seat assembly 10 (as disclosed in Taiwanese Utility Model Patent No. M386218 (Application No. 099200675)) for a bicycle includes a seat tube 11, a plug member 12 and a saddle 13. The seat tube 11 extends in an axis and has a connecting portion 111 at a top end thereof, two side grooves 112 respectively formed downwardly from the top end parallel to the axis, two through holes 113 formed in the connecting portion 111, and a plurality of annular grooves 114 formed in an outer periphery of the connecting portion 111 and spaced apart from one another along the axis.

The plug member 12 is plugged into the connecting portion 111, and has a main body 121 sealing the seat tubs 11, and two projections 122 respectively extending from a periphery of the main body 121 to respectively engage the side grooves 112.

The plug member 12 cooperates with the connecting portion 111 to define a chamber 14. The saddle 13 covers the connecting portion 111, the side grooves 112, the through holes 113, the annular grooves 114 and the chamber 14.

Due to the complex structure of the seat tube 11, not only is the manufacturing cost relatively high, but since the plug member 12 must seal the seat tube 11, the dimensions of the plug member 12 must also always be adjusted to match the size of the seat tube 11 once changed, and hence preparation and storage costs, as well as difficulty in process control, are increased.

SUMMARY OF THE INVENTION

Therefore, the object of the present invention is to provide a seat assembly that can eliminate the aforesaid drawbacks of the prior art.

According to the present invention, there is provided a seat assembly including a seat tube, a plug member and a saddle. The seat tube extends along an axis, and has an end portion forced with an opening that has a center coinciding with the axis, and a plurality of angularly-spaced apart through holes that surround the axis. The plug member is plugged into the opening, and has a chamber that is in spatial communication with the through holes. The saddle includes a saddle body, and a connecting portion that is connected to the saddle body. The connecting portion has a covering segment covering the end section, and an inner segment disposed in and connected to the covering segment and filled in the through holes and the chamber.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
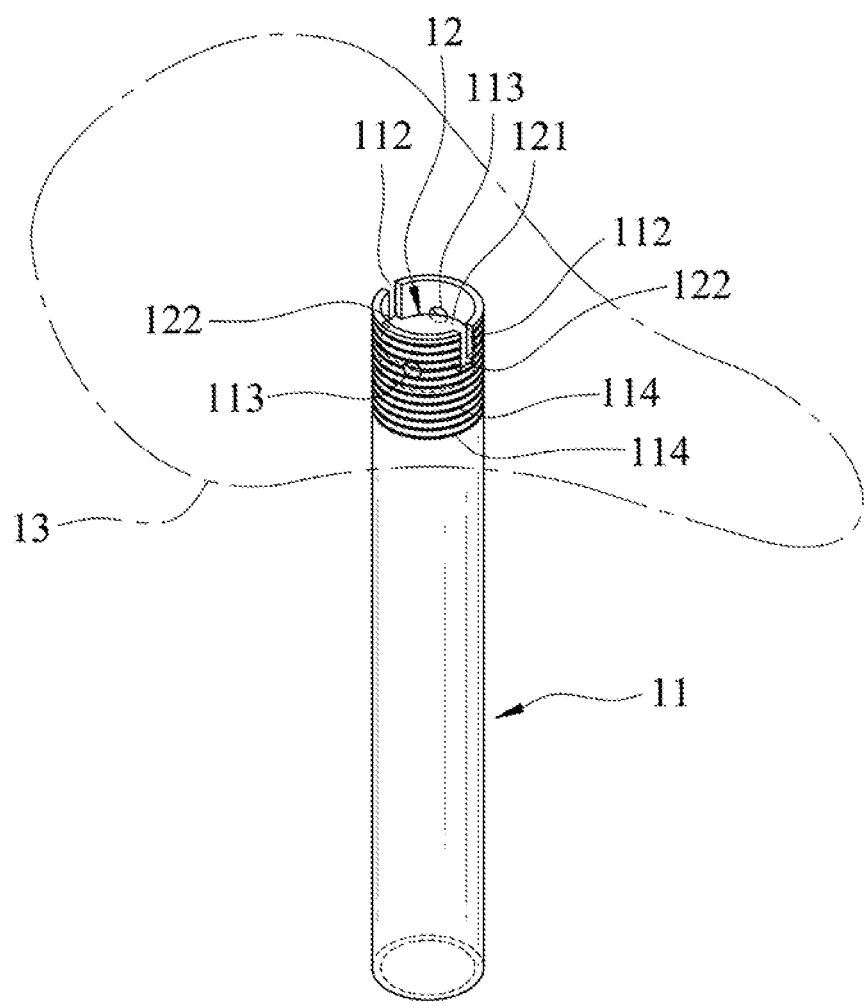
FIG. 1 is a schematic perspective view of a conventional seat assembly for a bicycle.
Figure 2:
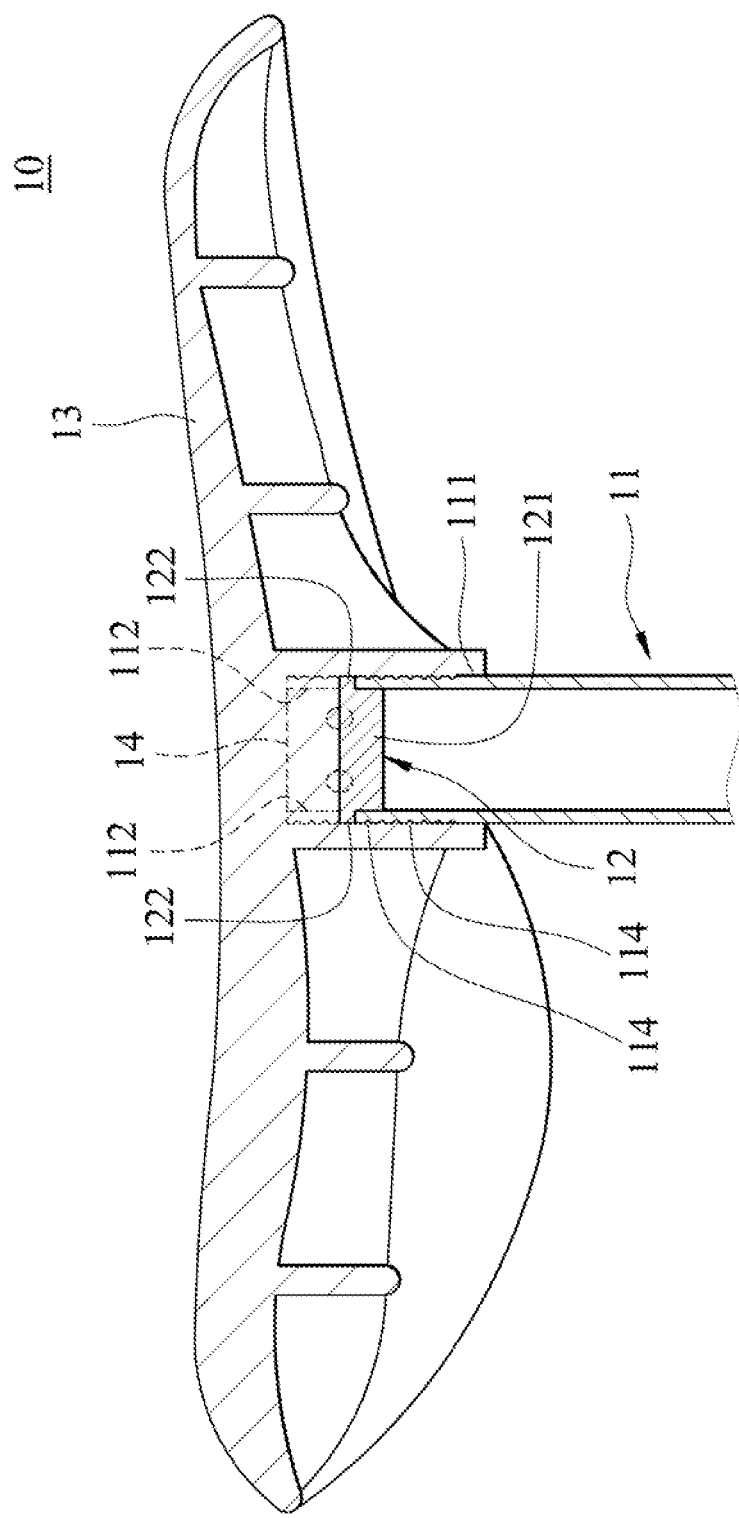
FIG. 2 is a fragmentary sectional view of the conventional seat assembly.
Figure 3:
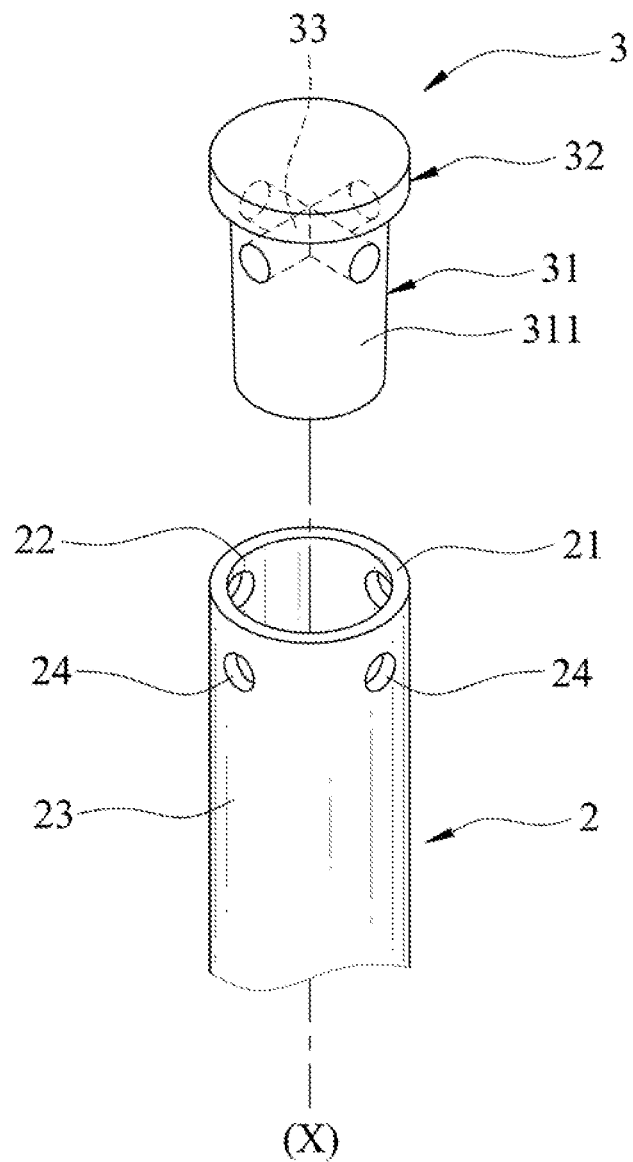
FIG. 3 is an exploded fragmentary perspective view of a plug member and a seat tube of a preferred embodiment of a seat assembly according to the present invention.
Figure 4:
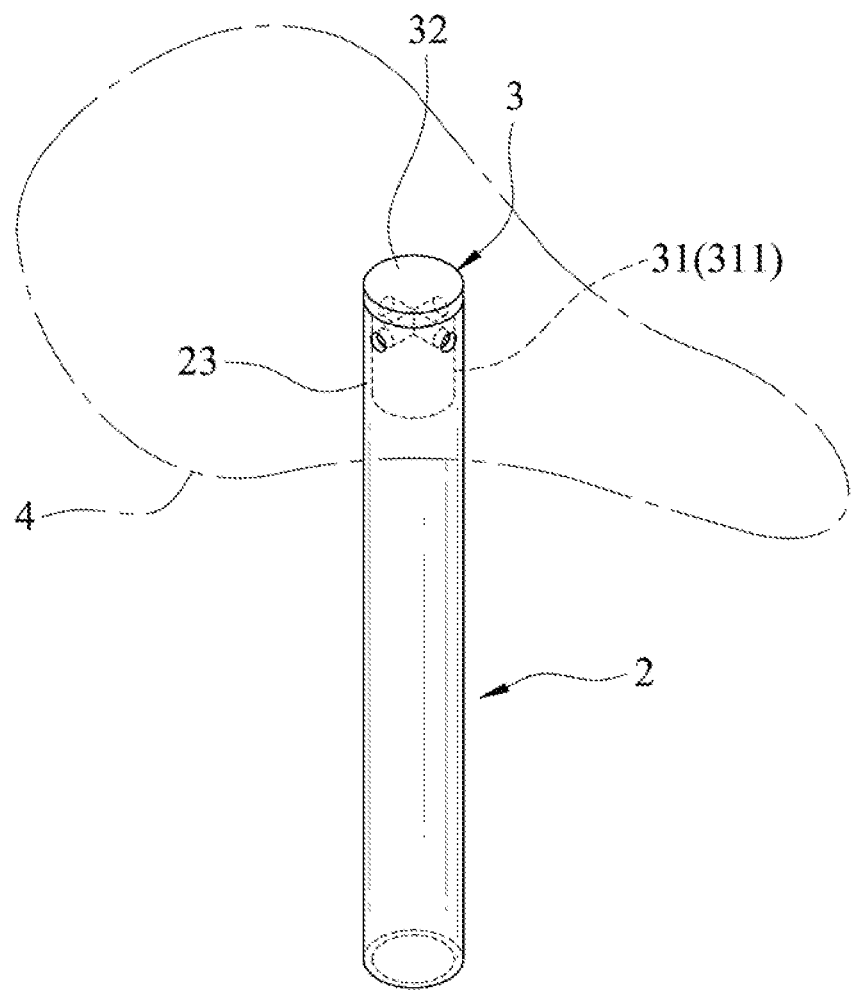
FIG. 4 is an assembled perspective view of the preferred embodiment.
Figure 5:
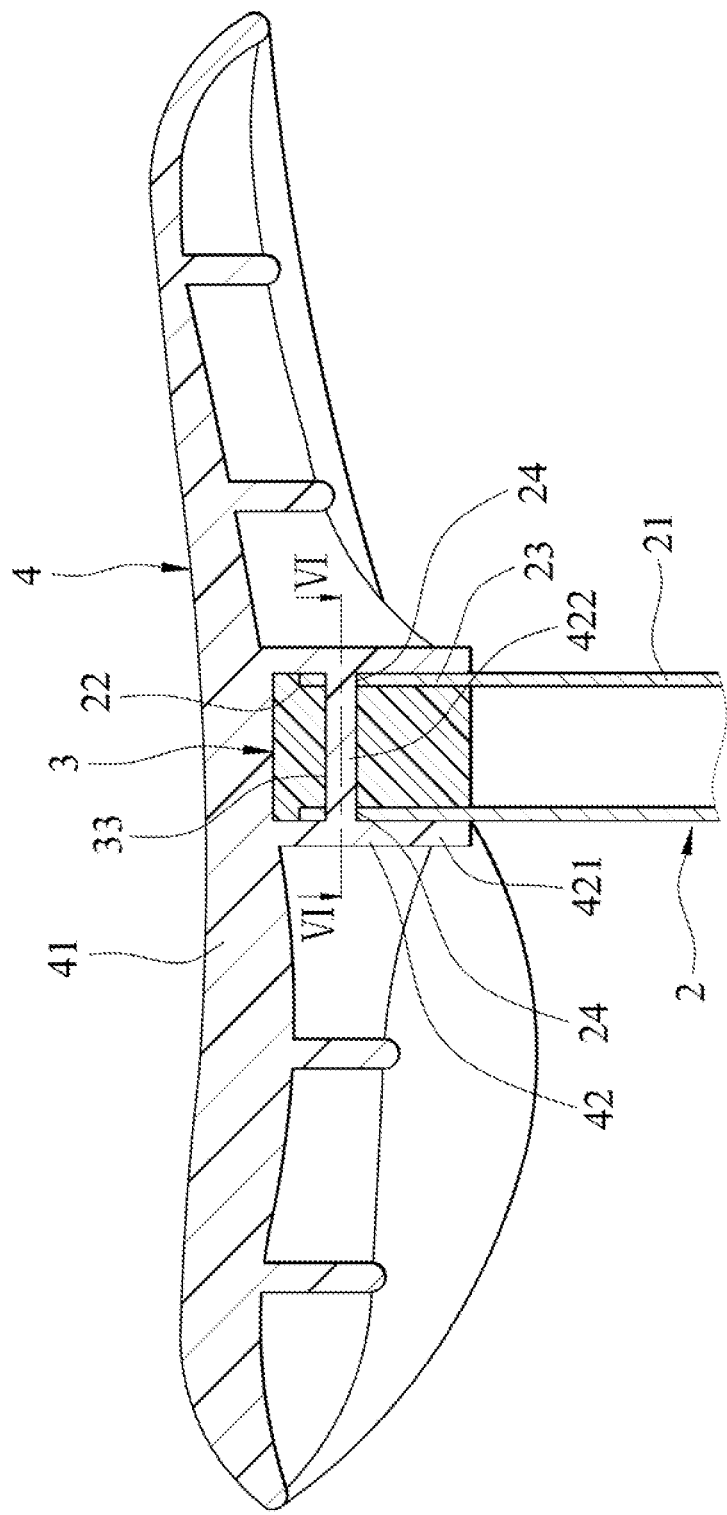
FIG. 5 is a fragmentary sectional view of the preferred embodiment.

Referring to FIGS. 3 to 5, a preferred embodiment of a seat assembly according to the present invention includes a seat tube 2, a plug member 3 and a saddle 4.

The seat tube 2 extends along an axis (X), and has a tube wall 21 surrounding the axis (X), an end portion 23 formed with an opening 22 whose center coincides with the axis (X), and a plurality or angularly-spaced apart through holes 24 that surround the axis. In this embodiment, there are four through holes 24 that are equiangularly-spaced from one another; in other possible embodiments, the number of through holes 24 may be two, three or five and is not limited to what is disclosed herein.

Figure 6:
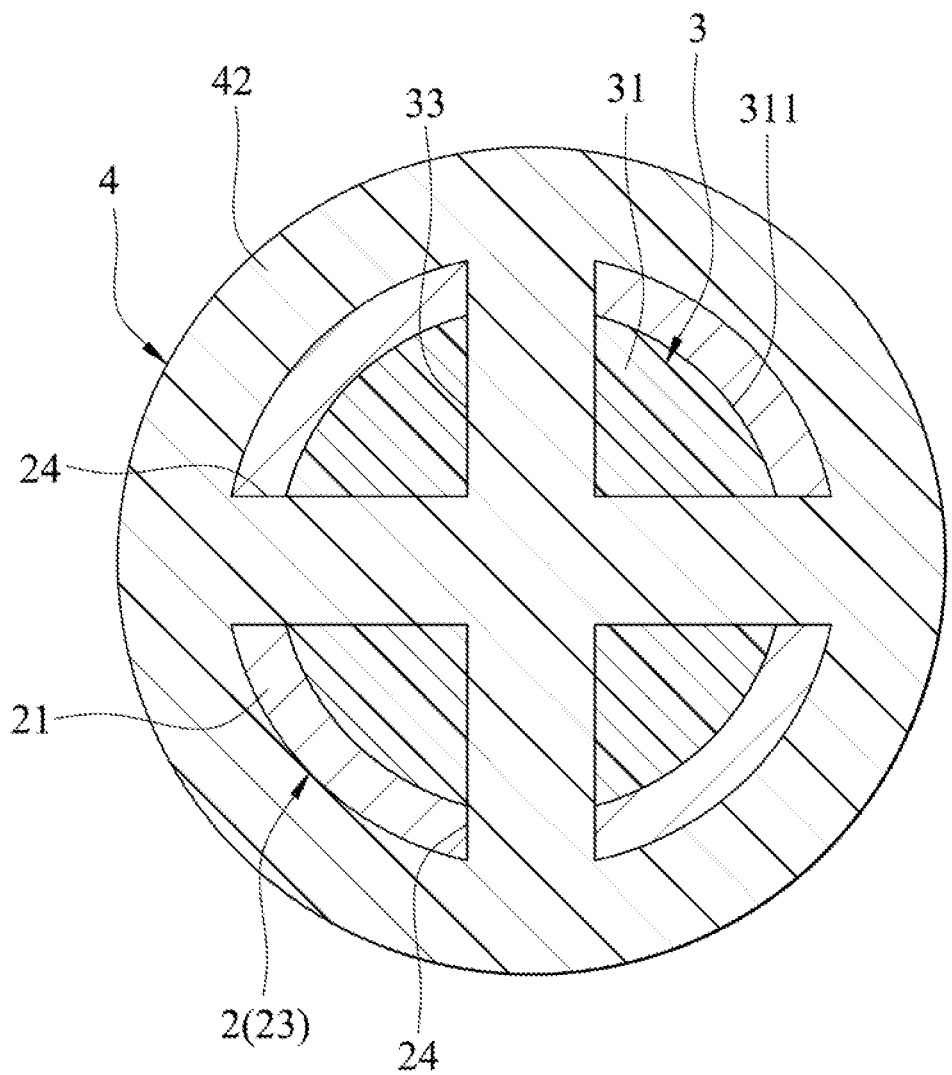
FIG. 6 is a sectional view of the preferred embodiment taken along line VI-VI of FIG. 5.

The plug member 3 is plugged into the opening 22, and has an inserting portion 31, a covering portion 32, and a chamber 33 that extends through, an outer surface 311 of the inserting portion 31 and that is in spatial communication with the through holes 24. The inserting portion 31 is inserted into the seat tube 2 and is formed with the chamber 33. The covering portion 32 is connected to an end of the inserting portion 31 that is proximate to the opening 22, covers the opening 22, and has an outer diameter that is greater than an inner diameter of the opening 22. In this embodiment, the plug member 3 is made of a plastic material, and the chamber 33 is substantially X-shaped (see FIG. 6).

The inserting portion 31 of the plug member 3 converges from the end thereof that is connected to the covering portion 32 toward an end thereof that is distal from the covering portion 32. In other words, the inserting portion 31 has a cross-section that gradually decreases in size toward the covering portion 32, allowing the plug member 3 to be easily fixed to the connecting portion 23 of the seat tube 2.

The saddle 4 includes a saddle body 41, and a connecting portion 42 that is connected to the saddle body 41. The connecting portion 42 includes a covering segment 421 covering the end portion 23 of the seat tube 2, and an inner segment 422 disposed in and connected to the covering segment 421 and filled in the through holes 24 and the chamber 33.

During manufacture, the plug member 3 is first plugged into the opening 22 in the seat tube 2, a tool is then used to penetrate through the end portion 23 and the plug member 3 for simultaneously forming the through holes 24 and the chamber 33 in directions perpendicular to the axis (X) of the end portion 23. Then, the seat tube 2 and the plug member 3 are placed in a mold for the connecting portion 42 of the saddle 4 to be formed therewith. In this embodiment, the through holes 24 and the chamber 33 are simultaneously formed, but they may also be independently formed in other embodiments.

In sum, the advantages of the present invention are as follows.

A) Since the structure of the seat tube 2 is simple, and since the through holes 24 and the chamber 33 may be simultaneously formed, the overall manufacturing time, difficulty and cost are all reduced while production yield and convenience are improved.

B) The covering portion 32 and the inserting portion 31 are configured such that the plug member 3 can be plugged into openings 22 of various sizes, reducing preparation and storage costs as well as difficulty in process control. Therefore, manufacturing cost is reduced while production efficiency is increased.

C) When forming the connecting portion 42 of the saddle 4 of the present invention, the material used in casting travels into the chamber 33 until the chamber 33 is filled up (i.e., until the inner segment 422 is formed) and an outer periphery of the through holes 24 is covered up (i.e., until the covering segment 421 is formed). This allows the saddle 4 and the end portion 23 to be fixed together to increase structural strength and safety when in use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A seat assembly comprising:
    a seat tube extending along an axis, and having an end portion that is formed with an opening whose center coincides with the axis, and a plurality of angularly-spaced apart through holes surrounding the axis;
    a plug member plugged into said opening, and having a chamber that is in spatial communication with said through holes; and
    a saddle including a saddle body, and a connecting portion that is connected to said saddle body, and that has a covering segment covering said end portion, and an inner segment disposed in and connected to said covering segment and filling in said through holes and said chamber.

2. The seat assembly as claimed in claim 1, wherein said plug member further has
    an inserting portion inserted into said seat tube and formed with said chamber, and
    a covering portion connected to an end of said inserting portion that is proximate to said opening, covering said opening, and having an outer diameter that is greater than an inner diameter of said opening.

3. The seat assembly as claimed in claim 2, wherein said inserting portion of said plug member converges from said end thereof that is connected to said covering portion toward an end thereof that is distal from said covering portion.

4. The seat assembly as claimed in claim 1, wherein said end portion of said seat tube is formed with four of said through holes, said through holes being equiangularly spaced from one another, said chamber being substantially X-shaped.

5. The seat assembly as claimed in claim 1, wherein said plug member is made of a plastic material.

* * * * *